(12) United States Patent
Obu (10) Patent No.: US 8,537,225 B2
(45) Date of Patent: Sep. 17, 2013

(54) IMAGE PICKUP APPARATUS AND IMAGE CONVERSION METHOD

(75) Inventor: Kenji Obu, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 50 days.

(21) Appl. No.: 12/765,022

(22) Filed: Apr. 22, 2010

(65) Prior Publication Data

US 2010/0271496 A1    Oct. 28, 2010

(30) Foreign Application Priority Data

Apr. 22, 2009   (JP) .................................. 2009-103890

(51) Int. Cl.
*H04N 5/228*    (2006.01)
(52) U.S. Cl.
USPC ..................... 348/208.5; 348/222.1; 348/241; 382/254
(58) Field of Classification Search
USPC ............................ 348/208.5, 222.1; 382/254
See application file for complete search history.

(56) References Cited

U.S. PATENT DOCUMENTS

| 6,392,816 | B1 | 5/2002 | Hamano |
| 2006/0110147 | A1* | 5/2006 | Tomita et al. .................... 396/55 |
| 2010/0188552 | A1* | 7/2010 | Feng et al. ..................... 348/340 |

FOREIGN PATENT DOCUMENTS

JP    2002-296633 A    10/2002

* cited by examiner

*Primary Examiner* — Sinh Tran
*Assistant Examiner* — Paul Berardesca
(74) *Attorney, Agent, or Firm* — Rossi, Kimms & McDowell LLP

(57) ABSTRACT

To reduce degradation of image quality occurring upon correction of an image shake, provided is an image pickup apparatus including: an image pickup optical system; an image pickup element for photoelectrically converting an image formed by the image pickup optical system; a processing unit for processing a taken image; a detection unit for detecting a shake of the image pickup apparatus; and an image stabilizing unit for decentering an image stabilizing lens unit formed as a part of the image pickup optical system based on a detection result from the detection unit. The processing unit performs the process by using an image restore filter corresponding to a position of the image stabilizing lens unit at a time of image taking.

14 Claims, 6 Drawing Sheets

IMAGE PICKUP APPARATUS AND IMAGE CONVERSION METHOD

BACKGROUND OF THE INVENTION

1. Field of the Invention

The present invention relates to an image pickup apparatus and an image conversion method, which may be applied to, for example, a video camera, a digital camera, and a TV camera.

2. Description of the Related Art

Image pickup apparatuses such as a video camera and a digital camera employ image stabilization systems for correcting a shake of an image. Of those, U.S. Pat. No. 6,392,816 discusses an optical image stabilization system for correcting an image shake by driving a lens unit serving as a part of an optical system in a direction perpendicular to an optical axis. Further, Japanese Patent Application Laid-Open No. 2002-296633 discusses an image pickup element image stabilization system for correcting the image shake by driving an image pickup element in the direction perpendicular to the optical axis.

In the optical image stabilization system and the image pickup element image stabilization system, decentration aberration is generated when the lens unit serving as the part or the image pickup element is caused to move in the direction perpendicular to the optical axis. This degrades image quality in comparison with a reference condition free of image stabilization. In other words, the image stabilization systems according to a conventional art may reduce an image shake but raise a problem that the image quality is degraded due to the decentration aberration.

SUMMARY OF THE INVENTION

An image pickup apparatus according to an aspect of the present invention includes: an image pickup optical system; an image pickup element for photoelectrically converting an image formed by the image pickup optical system; an image processing unit for performing an image process on a taken image; a shake detection unit for detecting a shake of the image pickup apparatus; and an image stabilizing unit for decentering an image stabilizing lens unit formed as a part of the image pickup optical system based on a detection result from the shake detection unit, in which the image processing unit performs the image process by using an image restore filter corresponding to a position of the image stabilizing lens unit at a time of image taking.

An image pickup apparatus according to another aspect of the present invention includes: an image pickup optical system; an image pickup element for photoelectrically converting an image formed by the image pickup optical system; an image processing unit for performing an image process on a taken image; a shake detection unit for detecting a shake of the image pickup apparatus; and an image stabilizing unit for decentering the image pickup element from the image pickup optical system based on a detection result from the shake detection unit, in which the image processing unit performs the image process by using an image restore filter corresponding to a position of the image pickup element at a time of image taking.

An image conversion method according to one aspect of the present invention includes: an image acquiring step of acquiring an image; an image taking information acquiring step of acquiring image taking information on the acquired image; a position information acquiring step of acquiring position information on an image stabilizing lens unit at a time of image taking; and an image restoring step of restoring the image by processing the acquired image by using an image restore filter decided based on the image taking information and the position information.

An image conversion method according to another aspect of the present invention includes: an image acquiring step of acquiring an image; an image taking information acquiring step of acquiring image taking information on the acquired image; a position information acquiring step of acquiring position information on an image pickup element at a time of image taking; and an image restoring step of restoring the image by processing the acquired image by using an image restore filter decided based on the image taking information and the position information.

According to the present invention, the image pickup apparatus and the image conversion method which may reduce degradation of an image quality occurring upon correction of the image shake may be provided.

Further features of the present invention will become apparent from the following description of exemplary embodiments with reference to the attached drawings.

DESCRIPTION OF THE EMBODIMENTS

An image pickup apparatus according to each exemplary embodiment of the present invention includes an image pickup optical system 101 for picking up an image of an object, an image pickup element 102 such as a CCD for photoelectrically converting the image formed by the image pickup optical system 101, and an image processing unit 104 for performing an image process on a taken image. Further the image pickup apparatus includes a hand-held shake detection unit (shake detection unit) for detecting a shake applied to the image pickup apparatus upon image taking and an image stabilizing unit 106 for decentering one of an image stabilizing lens unit 101b and the image pickup element 102 in order to correct an image shake generated due to the shake. Further the image pickup apparatus includes a position detection unit 111 for detecting a position of one of the image stabilizing lens unit 101b and the image pickup element 102 driven by the image stabilizing unit 106 (for example, a position thereof in a direction perpendicular to an optical axis). The image processing unit 104 performs the image process on the taken image by using an image restore filter corresponding to the position of one of the image stabilizing lens unit 101*b* and the image pickup element 102 decentered by the image stabilizing unit 106. Accordingly, an image in which decentration aberration of the image pickup optical system 101 is satisfactorily corrected may be obtained.

However, an appropriate image restore filter may be selected based on position control information on one of the image stabilizing lens unit 101*b* and the image pickup element 102 decentered by the image stabilizing unit 106 instead of detecting the position by the position detection unit 111. Description is made of an image processing method performed by the image pickup apparatus according to the exemplary embodiment of the present invention. When the image of the object is taken with a digital camera, the image is degraded due to aberration of an image pickup optical system. The aberration of the image pickup optical system has various kinds including spherical aberration, comatic aberration, curvature of field, astigmatism, distortion, and chromatic aberration. Known examples of a method of correcting the degradation of the image caused by the various kinds of aberration of the image pickup optical system include a method of performing an image process by using information on an optical transfer function (OTF) of the image pickup optical system. The image process for thus correcting the degradation of the image by using the information on the optical transfer function of the image pickup optical system is called "image restore process".

Hereinafter, description is made of an outline of the image restore process. It is assumed that a degraded image is $g(x,y)$, an original image thereof is $f(x,y)$, and a point spread function (PSF) that is a Fourier pair of the optical transfer function (OTF) of the image pickup optical system is $h(x,y)$. In this case, the following equation is established:

$$g(x,y)=h(x,y)*f(x,y)$$

where * represents a convolution (sum of products), and $(x,y)$ represents coordinates on the image.

Further, the above-mentioned equation is Fourier transformed into a representation format on a frequency plane. Then, a format of products on a frequency basis is obtained as in the following equation:

$$G(u,v)=H(u,v)\cdot F(u,v)$$

where H represents the optical transfer function (OTF), which is obtained by Fourier transforming the point spread function (PSF), and $(u,v)$ represents coordinates on a two-dimensional frequency plane, that is, a frequency.

In order to obtain the original image from the degraded image taken by the image pickup optical system, both sides may be divided by the optical transfer function H as follows:

$$G(u,v)/H(u,v)=F(u,v)$$

By inverse Fourier transforming $F(u,v)$ to regain a real plane, the original image $f(x,y)$ may be obtained.

Here, by using R that is obtained by inverse Fourier transforming the optical transfer function H, the original image may be obtained similarly by performing a convolution process on the image on the real plane as follows:

$$g(x,y)*R(x,y)=f(x,y)$$

The inverse Fourier transform $R(x,y)$ is called the "image restore filter". In general, when the image is two-dimensional, the image restore filter is also a two-dimensional filter having a cell corresponding to each pixel of the image. Further, as the number of taps (number of cells) of the image restore filter $R(x,y)$ increases, accuracy for restoring the image may be further improved. Therefore, the image restore filter is used by setting the number of taps that may be realized corresponding to requested image quality, image processing capability, characteristics of aberration, and the like. The image restore filter $R(x,y)$ needs to reflect at least the characteristics of the aberration. The above-mentioned image restore filter is a technical field distinct from a conventional art such as an edge enhancement filter (high-pass filter) having only three taps in horizontal and vertical directions.

Further, an actual image has a noise component. Hence, if the image restore filter $R(x,y)$ created by taking a perfect inverse number of the optical transfer function (OTF) is used as described above, the noise component is amplified along with the degraded image $g(x,y)$, which generally results in an unsatisfactory image. In this respect, for example, a control method that handles an intensity ratio between an image signal and a noise signal (signal-to-noise ratio), such as a Wiener filter, is known. The control method includes suppressing amplification because a smaller absolute value of the optical transfer function (OTF) on a frequency basis leads to a worse signal-to-noise ratio while increasing the amplification because a larger absolute value of the optical transfer function (OTF) leads to a more excellent signal-to-noise ratio.

As a method of correcting the degradation of a color drift component of the image, the above-mentioned image restore filter $R(x,y)$ is prepared for each color component, and a phase shift component due to a wavelength is taken into account for the image restore filter, which may correct misregistration. Further, a method for correction by using a geometric transformation is applied to magnification chromatic aberration, which is misregistration on the image. Further, the optical transfer function (OTF) varies according to image taking conditions such as a zooming position, a aperture stop diameter, and an image taking distance and an image height (position of the image), and hence the image restore filter used for the image restore process is preferably changed corresponding thereto.

Figure 1:
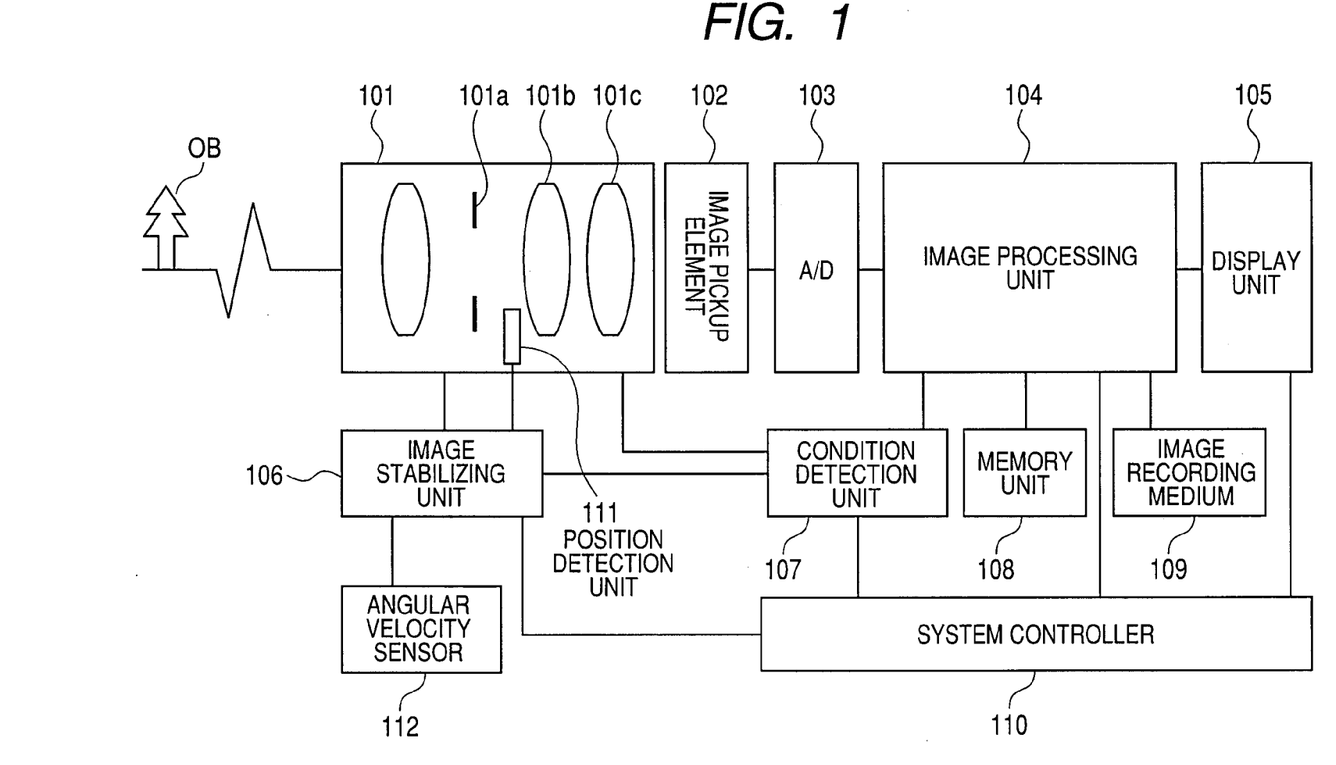
FIG. 1 is a configuration diagram of an image pickup apparatus according to a first embodiment of the present invention.

Next, the accompanying drawings are referenced to describe specific embodiments of the image pickup apparatus using an image conversion method according to the present invention. FIG. 1 is a configuration diagram of the image pickup apparatus according to a first embodiment of the present invention. An object OB is imaged onto the image pickup element 102 by the image pickup optical system 101. Light is converted into an electrical signal by the image pickup element 102. The electrical signal is converted into a digital signal by an A/D converter 103. The digital signal is input to the image processing unit 104. In the image processing unit 104, the above-mentioned image restore process is performed along with a predetermined process.

If the image stabilization is available, the following process is performed. The image stabilization control unit (image stabilizing unit) 106 receives inputs of: information from an angular velocity sensor (shake detection unit) 112 for detecting a shake of the image pickup apparatus; and information from the position detection unit 111 for detecting a position of the image stabilizing lens unit 101*b*. The image stabilization control unit (image stabilizing unit) 106 causes the image stabilizing lens unit 101*b* to move by a drive amount calculated based on the above-mentioned information. The taken image picked up by the image pickup element 102 and input to the image processing unit 104 via the A/D converter 103 becomes an image in which the image shake has been corrected.

The image processing unit 104 receives an input of image taking information on the image pickup optical system 101 including the zooming position, the aperture stop diameter, and a focus lens position, which is obtained by a condition detection unit 107. In addition, if the image stabilization is available, position information on the image stabilizing lens unit 101*b* detected by the position detection unit 111 is input from the image stabilization control unit 106 to the image processing unit 104 via the condition detection unit 107. If the image stabilization is unavailable, the image restore filter prestored in a memory unit 108 is selected based on the image taking information obtained from the condition detection unit 107, and input to the image processing unit 104. Here, the image taking information represents information regarding the image taking conditions for the image pickup optical system 101, which include the zooming position, the aperture stop diameter, and a focus position.

Meanwhile, if the image stabilization is available, the image restore filter prestored in the memory unit 108 is selected based on the position information on the image stabilizing lens unit 101*b* obtained from the position detection unit 111 in addition to the image taking information obtained from the condition detection unit 107. Then, the image restore filter is input to the image processing unit 104. In the image processing unit 104, the above-mentioned image restore process is performed on the taken image obtained by the image pickup element 102 by using the image restore filter input from the memory unit 108.

This embodiment is configured to cause the image stabilizing lens unit 101*b* to move by the image stabilizing unit 106, but an entirety of the image pickup optical system 101 may be caused to move. Further, if the image pickup optical system 101 is an interchangeable lens, the image restore filter stored in a memory unit included in the image pickup optical system 101 may be used for the image restore process.

Figure 2:
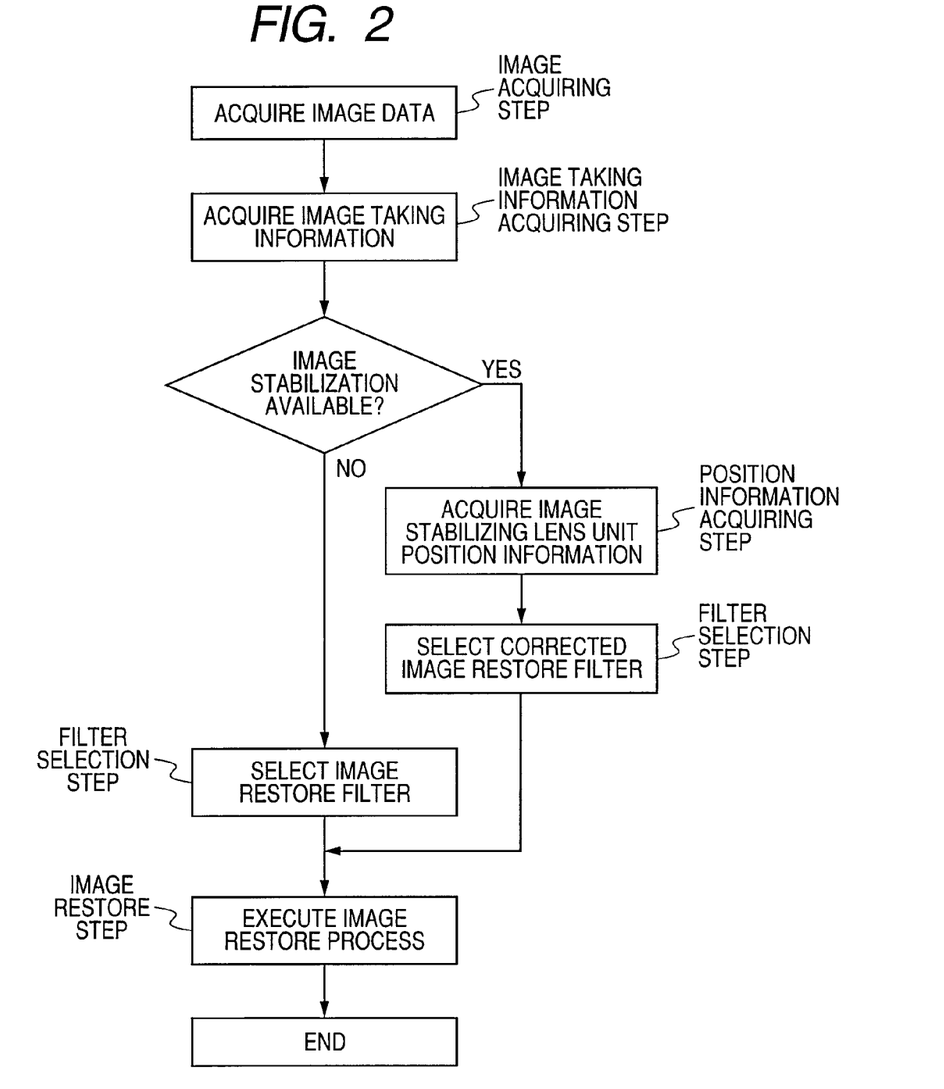
FIG. 2 is a flowchart of an image processing method according to the first embodiment of the present invention.

FIG. 2 is a flowchart regarding the image conversion method according to this embodiment. In the first step, an image is acquired from the image pickup element 102 (image acquiring step). Subsequently, the image taking information is acquired from the condition detection unit 107 (image taking information acquiring step). Subsequently, it is determined whether an image stabilization system is available or unavailable. If the image stabilization system is unavailable, that is, if the image stabilizing lens unit 101*b* and the image pickup element 102 are on the same axis and are not decentered from each other, the image restore filter is selected based on the above-mentioned image taking information (filter selection step). Meanwhile, if the image stabilization system is available, that is, if the image stabilizing lens unit 101*b* is decentered, the image restore filter is selected based on the position information on the image stabilizing lens unit 101*b* acquired from the position detection unit 111 and the image taking information (position information acquiring step and filter selection step). In the filter selection step, instead of selecting the image restore filter prestored in the memory unit 108, the optimum image restore filter may be created by subjecting multiple prestored image restore filters to a predetermined calculation. Finally, the image restore process is performed by using the image restore filter selected or created in the filter selection step (image restore step).

Figure 4:
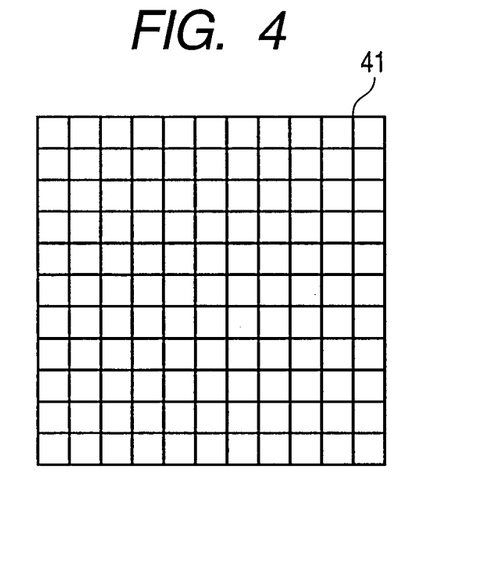
FIG. 4 is an explanatory diagram of an image restore filter according to the first embodiment of the present invention.

FIG. 4 is an explanatory diagram of the image restore filter. The number of taps of the image restore filter 41 may be decided based on an amount of the aberration of the image pickup optical system 101. In this embodiment, the description is made by using the two-dimensional filter having 11×11 taps. In the image restore step, the convolution process is performed on each tap of the image restore filter with respect to each pixel. As illustrated in FIG. 4, by setting the image restore filter 41 as the two-dimensional filter divided into 100 areas or more, the image may be restored from the spherical aberration, the comatic aberration, the chromatic aberration on the axis, or the magnification chromatic aberration, which are caused by the image pickup optical system 101. Further, by subjecting the image restore filter 41 in such a real space to the convolution process with respect to the input image, the image may be restored without performing Fourier transform within the image pickup apparatus.

Figure 5:
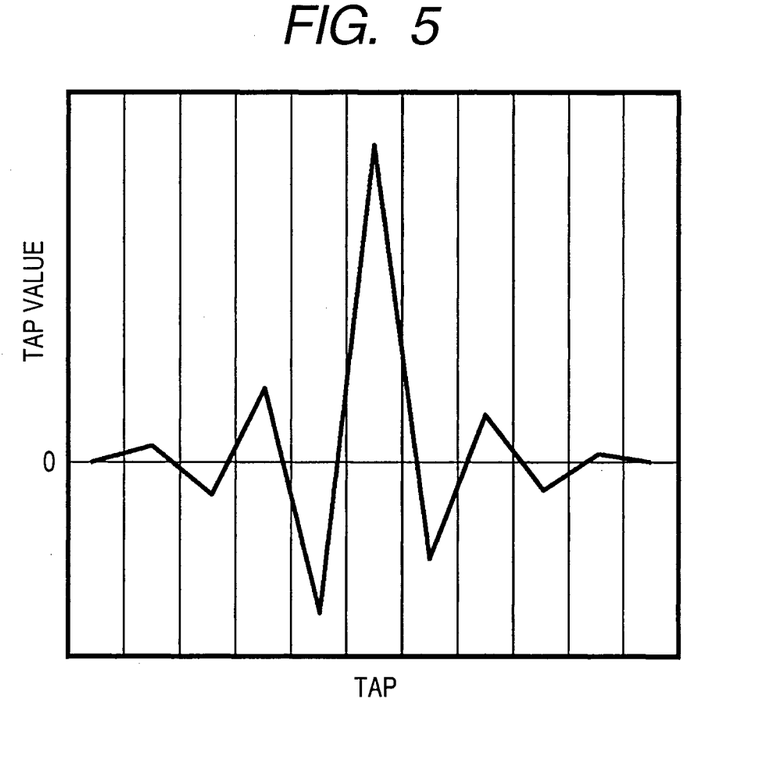
FIG. 5 is a sectional diagram of the image restore filter according to the first embodiment of the present invention.

FIG. 5 is a sectional diagram of the image restore filter 41 of FIG. 4 when viewed from one direction. The image restore filter 41 may be obtained by calculating or measuring the optical transfer function (OTF) of the image pickup optical system 101 and subjecting an inverse function thereof to inverse Fourier transform. In general, an influence of noise needs to be taken into consideration, and hence a creation method for a Wiener filter or an image restore filter related thereto may be selected and used. In addition, the optical transfer function (OTF) may include a factor in degrading the optical transfer function (OTF) with respect to not only the image pickup optical system 101 but also the image input to the image processing unit 104.

For example, the low-pass filter suppresses a high frequency component among frequency characteristics of the optical transfer function (OTF). Further, a shape of a pixel aperture and an aperture ratio of the image pickup element 102 also exert influences upon the frequency characteristics. Examples thereof also include spectral characteristics of a light source and spectral characteristics of various wavelength filters. It is desirable that the image restore filter 41 be created based on the generalized optical transfer function (OTF) including those examples. Further, in a case where the image is a color image in an RGB format, three image restore filters corresponding to the respective color components of R, G, and B may be created. In other words, the chromatic aberration of the image pickup optical system 101 may be corrected by using image restore filters corresponding to different color components on a one-to-one basis. Note that in this embodiment, the image restore filter 41 is in a square arrangement, but a method for arranging taps is not limited to the square arrangement but may be arbitrarily set.

Subsequently, in the image restore step, the selected image restore filter 41 is used to thereby perform the convolution process on the taken image that has been input. Accordingly, an unsharp component of the image due to the aberration of the image pickup optical system may be eliminated or reduced. FIG. 1 is referenced to describe an optical image stabilization system of the image pickup apparatus according to this embodiment. The image stabilizing lens unit 101*b* included in the image pickup optical system 101 may be driven so as to correct the image shake in such a direction as to have a component in a direction perpendicular to the optical axis of the image pickup optical system 101. By using a gyroscope or the like, the angular velocity sensor (shake detection unit) 112 may acquire information regarding the shake of the image pickup apparatus in the form of, for example, acceleration, angular acceleration, angular velocity, or angular displacement. A detection result from the angular velocity sensor 112 is replaced with a target position signal by the image stabilization control unit 106. Then, the image stabilizing lens unit 101*b* is caused to move by the image stabilization control unit (image stabilizing unit) 106 so as to have a small difference between a position signal of the image stabilizing lens unit 101*b* obtained from the position detection unit 111 and the target position signal.

Figure 6:
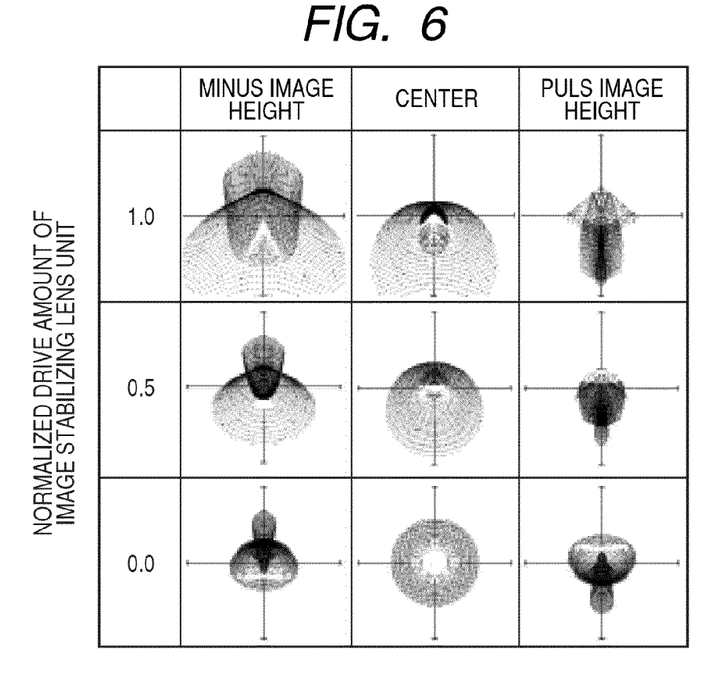
FIG. 6 is an explanatory diagram of decentration aberration.

FIG. 6 illustrates the decentration aberration generated when the image stabilizing lens unit 101*b* is caused to move. Specifically, FIG. 6 illustrates the point spread functions (PSFs) on an image plane at three points of a minus image height, a center, and a plus image height in terms of the drive amount of the image stabilizing lens unit 101*b* in a case where the maximum drive amount is normalized to 1. A longitudinal axis of each of the point spread functions (PSFs) indicates an image height direction, and a lateral axis thereof indicates a direction perpendicular to the image height direction. When the normalized drive amount of the image stabilizing lens unit 101b is 0, that is, when the image stabilizing lens unit 101b is located on the optical axis of the entire system, it is assumed that the entirety of the image pickup optical system 101 has rotational symmetry with respect to the optical axis. In this case, the point spread function (PSF) has rotational symmetry with respect to the optical axis. However, if the image stabilizing lens unit 101b is caused to move in a direction orthogonal to the optical axis, the point spread function (PSF) is changed to have rotational asymmetry with respect to the optical axis.

The image restore filter according to this embodiment is retained in the memory unit 108 in a format of a multidimensional matrix in which the image taking conditions such as the image height, the zooming position, the aperture stop diameter, and the focus lens position and the position of the image stabilizing lens unit 101b with respect to the optical axis which is caused to change during an exposure time at a time of the image taking are set as parameters. The position detection unit 111 detects the position of the image stabilizing lens unit 101b within a sampling time period that is arbitrarily set.

First Embodiment

Figure 7:
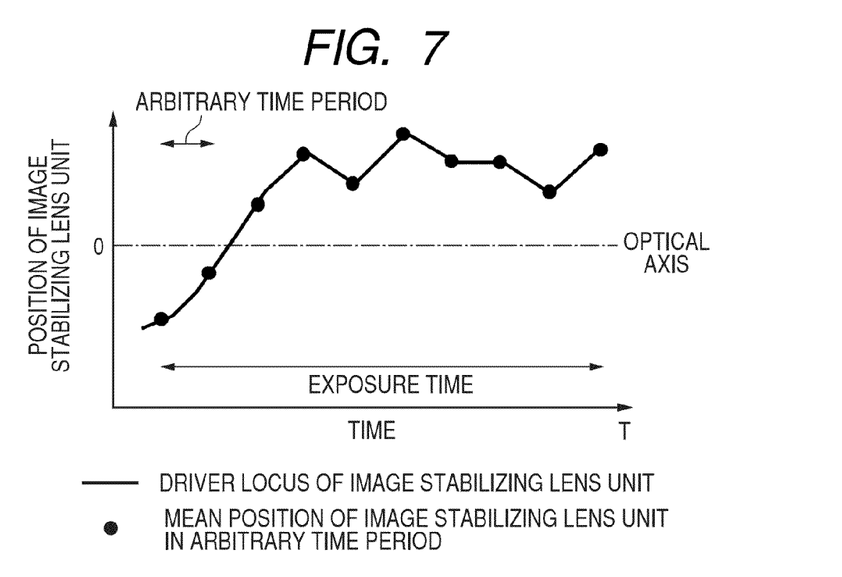
FIG. 7 is an explanatory diagram regarding a position information acquiring step according to the first embodiment of the present invention.

In the first embodiment, a mean position of the image stabilizing lens unit 101b is obtained during the exposure time at the time of the image taking. If the position of the image stabilizing lens unit 101b is caused to change during the exposure time as illustrated in FIG. 7, the image restore filter based on optical performance corresponding to the mean position of the image stabilizing lens unit 101b is selected for the taken image, and the image restore process is executed by the image processing unit 104. By performing such an image restore process, the degradation of the image due to the decentration aberration of the image pickup optical system 101 may be corrected. Therefore, satisfactory image quality may be obtained with the image shake corrected. In this embodiment, information to be prepared for the multidimensional matrix is the image restore filter.

According to this embodiment, by performing the image process on the image stabilizing lens unit 101b within the optical image stabilization system by using the image restore filter corresponding to a mean position obtained during the exposure time at the time of the image taking, the degradation of the image due to the decentration aberration may be satisfactorily corrected.

Second Embodiment

Figure 3:
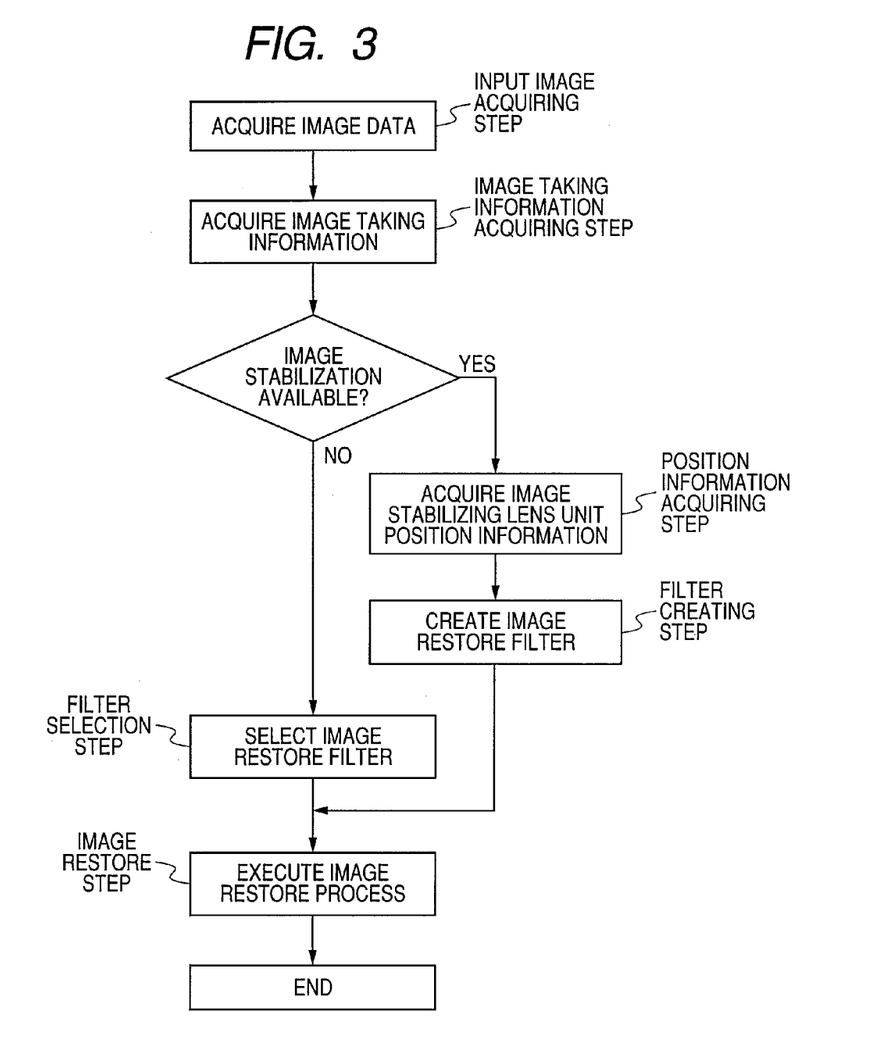
FIG. 3 is a flowchart of an image processing method according to a second embodiment of the present invention.

In a second embodiment, a new point spread function (PSF) is obtained by calculating a mean value of the point spread functions (PSFs) corresponding to respective positions of the image stabilizing lens unit 101b within the exposure time. The image restore filter is created based on the new point spread function (PSF), and the image restore process is executed on the taken image. In this embodiment, the information to be prepared for the multidimensional matrix is the point spread function (PSF). As described above, in this embodiment, the image restore filter for the image stabilization is created based on a point spread function obtained by calculating the mean value of the point spread functions (PSFs) corresponding to the respective positions of the image stabilizing lens unit 101b within the optical image stabilization system. FIG. 3 is a flowchart regarding such an image conversion method according to the second embodiment. The image conversion method according to this embodiment is different from the method described in the first embodiment in that the input image is acquired as image data and that the image restore filter is created. The above-mentioned configuration produces the same effects as in the first embodiment.

Third Embodiment

Figure 8:
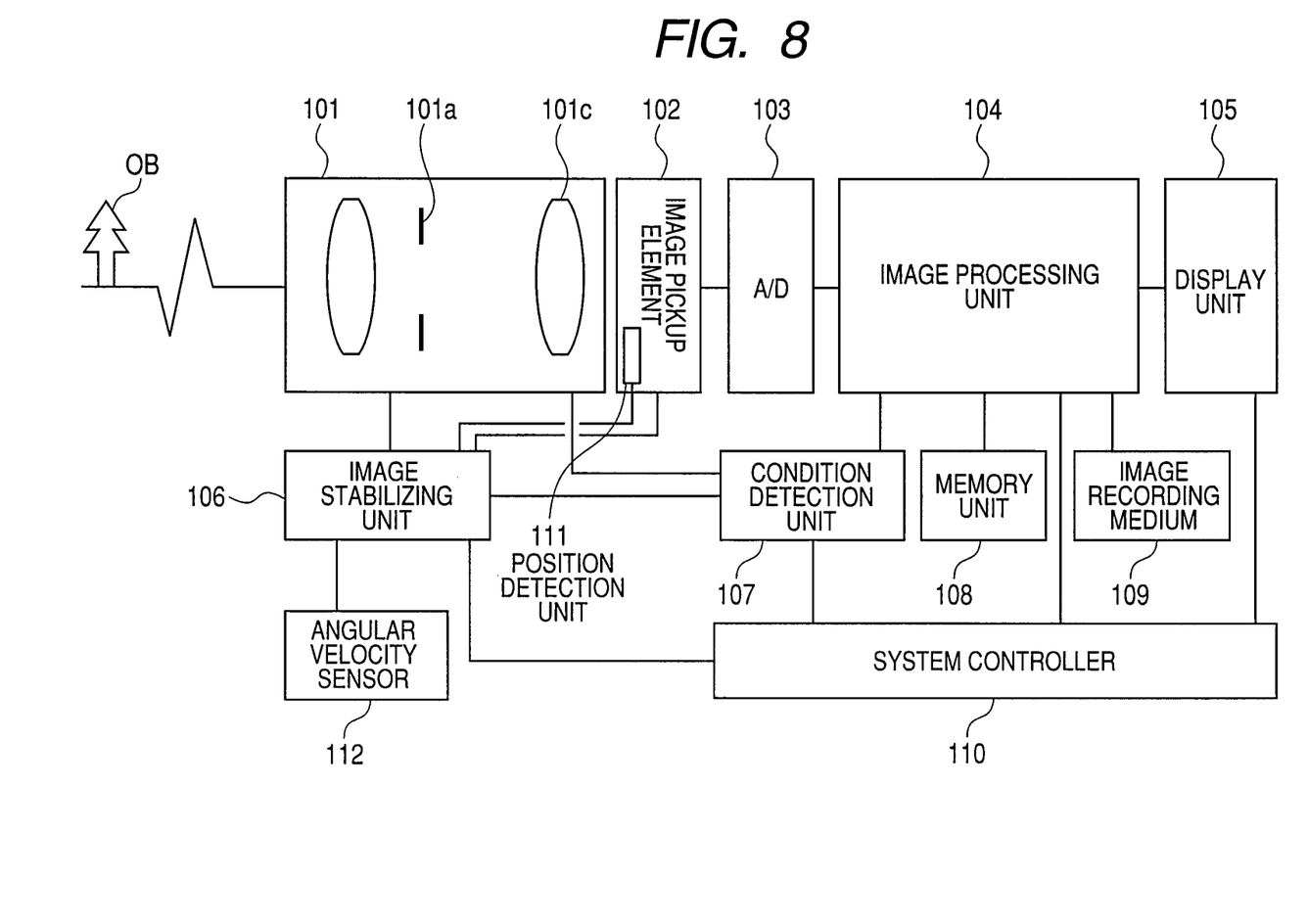
FIG. 8 is a configuration diagram of an image pickup apparatus according to a third embodiment of the present invention.

FIG. 8 is a schematic diagram of main components according to a third embodiment of the present invention. FIG. 8 illustrates the same configuration as FIG. 1 except that the position detection unit 111 detects a position of the image pickup element 102 in an optical axis direction. The third embodiment is different from the first and second embodiments in that the image pickup element image stabilization system corrects the image shake by causing the image pickup element 102 to move in such a direction as to have a component in the direction perpendicular to the optical axis. By performing the image process to which the image restore filter as in the first and second embodiments is applied, the degradation of the image caused when the image shake is corrected by moving the image pickup element may be reduced. According to each of the exemplary embodiments of the present invention, the image pickup apparatus and the image conversion method which may reduce the degradation of the image quality caused when the image shake is corrected may be provided. Note that in the image restore step, the process may desirably be performed pixel by pixel, but may be performed for each of regions including multiple pixels in order to enhance processing speed. Then, an output image subjected to the image restore process in the image processing unit 104 is saved to an image recording medium 109 in a predetermined format. The output image is an image in which the unsharp component due to the decentration aberration is sharpened by the image restore process.

A series of control is performed by a system controller 110. The system controller 110 instructs the image stabilization control unit 106 to mechanically drive the image stabilizing lens unit 101b or the image pickup element 102. An aperture stop 101a has the aperture diameter controlled as a setting for the image taking condition of an F-number. A focus lens 101c has a position thereof controlled by an autofocus (AF) mechanism (not shown) or a manual focus mechanism (not shown) in order to perform focal adjustment according to an object distance. An optical element such as a low-pass filter or an infrared cut filter may be included in the image pickup optical system 101. However, in a case of using an element such as the low-pass filter which exerts an influence upon the characteristics of the optical transfer function (OTF), presence thereof may be reflected upon the image restore filter. The infrared cut filter also exerts an influence upon the point spread functions (PSFs) in RGB channels which are integral values of the point spread functions (PSFs) of spectral wavelengths, in particular, upon the point spread function (PSF) in the R channel. Therefore, the presence of the infrared cut filter may be reflected upon the image restore filter.

Further, the image pickup optical system 101 is constructed as a part of the image pickup apparatus, but may be exchangeable as in a single lens reflex camera. Further, the optical transfer function (OTF) changes depending upon a field angle (image height) of the image pickup optical system even under one of the image taking conditions, and hence different image restore processes may desirably be performed on each of the regions set corresponding to the image height. In other words, when the image restore filter is caused to scan on the image while performing the convolution process, the image restore filter may be changed in turn on a region basis.

The exemplary embodiments have been discussed with regard to the image pickup apparatus involving the image processing method according to the present invention. However, the image processing method according to the present invention allows various modifications and changes to be made within the scope of the gist. Use thereof is not limited for the image pickup apparatus. For example, the image processing method according to the present invention may be used as an algorithm for image processing software that runs on a PC.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-103890, filed on Apr. 22, 2009, which is hereby incorporated by reference herein in its entirety.

What is claimed is:

1. An image pickup apparatus comprising:
an image pickup optical system;
an image pickup element for photoelectrically converting an image formed by the image pickup optical system;
an image processing unit for performing an image process on a taken image;
a shake detection unit for detecting a shake of the image pickup apparatus;
an image stabilizing unit for decentering an image stabilizing lens unit formed as a part of the image pickup optical system based on a detection result from the shake detection unit,
wherein the image processing unit performs the image process to reduce a decentering aberration generated by decentering of the image stabilizing unit using an image restore filter based on an averaged point spread function obtained by calculating a mean value of point spread functions corresponding to respective positions of the image stabilizing lens unit during the exposure time at a time of image taking, and
wherein the image restore filter is obtained on the basis of a point spread function having a rotational asymmetry with respect to an optical axis.

2. The image pickup apparatus according to claim 1, further comprising a position detection unit for detecting the position of the image stabilizing lens unit.

3. An image pickup apparatus comprising:
an image pickup optical system;
an image pickup element for photoelectrically converting an image formed by the image pickup optical system;
an image processing unit for performing an image process on a taken image;
a shake detection unit for detecting a shake of the image pickup apparatus; and
an image stabilizing unit for decentering the image pickup element from the image pickup optical system based on a detection result from the shake detection unit,
wherein the image processing unit performs the image process to reduce a decentering aberration generated by decentering of the image pickup element using an image restore filter based on an averaged point spread function obtained by calculating a mean value of point spread functions corresponding to respective positions of the image pickup element during an exposure time at a time of image taking, and
wherein the image restore filter is obtained on the basis of a point spread function having a rotational asymmetry with respect to an optical axis.

4. The image pickup apparatus according to claim 3, further comprising a position detection unit for detecting the position of the image pickup element.

5. An image conversion method for an image pickup apparatus having an image stabilizing lens unit, the method comprising:
an image acquiring step of acquiring an image;
an image taking information acquiring step of acquiring image taking information on the acquired image;
a position information acquiring step of acquiring position information on the image stabilizing lens unit at a time of image taking; and
an image restoring step of restoring the acquired image to reduce a decentering aberration generated by decentering of the image stabilizing lens unit by processing the acquired image using an image restore filter decided based on the image taking information and the position information,
wherein the image restore filter is obtained on the basis of a point spread function having a rotational asymmetry with respect to an optical axis, and
wherein the image restore filter is created based on an averaged point spread function obtained by calculating a mean value of the point spread functions corresponding to respective positions of the image stabilizing lens unit during an exposure time at a time of taking the image.

6. An image conversion method for an image pickup apparatus having an image pickup element, the method comprising:
an image acquiring step of acquiring an image;
an image taking information acquiring step of acquiring image taking information on the acquired image;
a position information acquiring step of acquiring position information on the image pickup element at a time of image taking; and
an image restoring step of restoring the acquired image to reduce a decentering aberration generated by decentering of the image pickup element by processing the acquired image using an image restore filter decided based on the image taking information and the position information,
wherein the image restore filter is obtained on the basis of a point spread function having a rotational asymmetry with respect to an optical axis, and
wherein the image restore filter is created based on an averaged point spread function obtained by calculating a mean value of the point spread functions corresponding to respective positions of the image pickup element during an exposure time at a time of taking the image.

7. An image pickup apparatus comprising:
an image pickup optical system;
an image pickup element for photoelectrically converting an image formed by the image pickup optical system;
an image processing unit for performing an image process on a taken image;
a shake detection unit for detecting a shake of the image pickup apparatus;
an image stabilizing unit for decentering an image stabilizing lens unit formed as a part of the image pickup optical system based on a detection result from the shake detection unit,
wherein the image processing unit performs the image process to reduce a decentering aberration generated by decentering the image stabilizing unit using an image restore filter based on a plurality of point spread functions corresponding to respective positions of the image stabilizing lens unit during an exposure time at a time of image taking.

8. An image pickup apparatus according to claim 7, wherein the image processing unit performs the image process to reduce a decentering aberration generated by decentering the image stabilizing unit using an image restore filter based on an averaged point spread function obtained by calculating a mean value of point spread functions corresponding to respective positions of the image stabilizing lens unit during an exposure time at a time of image taking.

9. An image pickup apparatus comprising:
an image pickup optical system;
an image pickup element for photoelectrically converting an image formed by the image pickup optical system;
an image processing unit for performing an image process on a taken image;
a shake detection unit for detecting a shake of the image pickup apparatus; and
an image stabilizing unit for decentering the image pickup element from the image pickup optical system based on a detection result from the shake detection unit,
wherein the image processing unit performs the image process to reduce a decentering aberration generated by decentering the image pickup element using an image restore filter based on a plurality of point spread functions corresponding to respective positions of the image pickup element during an exposure time at a time of image taking.

10. An image pickup apparatus according to claim 9, wherein the image processing unit performs the image process to reduce a decentering aberration generated by decentering the image pickup element using an image restore filter based on an averaged point spread function obtained by calculating a mean value of point spread functions corresponding to respective positions of the image pickup element during an exposure time at a time of image taking.

11. An image pickup apparatus comprising:
an image pickup optical system;
an image pickup element for photoelectrically converting an image formed by the image pickup optical system;
an image processing unit for performing an image process on a taken image;
a shake detection unit for detecting a shake of the image pickup apparatus;
an image stabilizing unit for decentering an image stabilizing lens unit formed as a part of the image pickup optical system based on a detection result from the shake detection unit,
wherein the image processing unit performs the image process to reduce a decentering aberration generated by decentering the image stabilizing unit using an image restore filter corresponding to a position calculated by using respective positions of the image stabilizing lens unit during an exposure time at a time of image taking.

12. An image pickup apparatus according to claim 11, wherein the image processing unit performs the image process to reduce a decentering aberration generated by decentering the image stabilizing unit using an image restore filter corresponding to a mean position of the image stabilizing lens unit during an exposure time at a time of image taking.

13. An image pickup apparatus comprising:
an image pickup optical system;
an image pickup element for photoelectrically converting an image formed by the image pickup optical system;
an image processing unit for performing an image process on a taken image;
a shake detection unit for detecting a shake of the image pickup apparatus; and
an image stabilizing unit for decentering the image pickup element from the image pickup optical system based on a detection result from the shake detection unit,
wherein the image processing unit performs the image process to reduce a decentering aberration generated by decentering the image pickup element using an image restore filter corresponding to a position calculated by using respective positions of the image pickup element during an exposure time at a time of image taking.

14. An image pickup apparatus according to claim 13, wherein the image processing unit performs the image process to reduce a decentering aberration generated by decentering the image pickup element using an image restore filter corresponding to a mean position of the image pickup element during an exposure time at a time of image taking.

* * * * *